Figure 1:
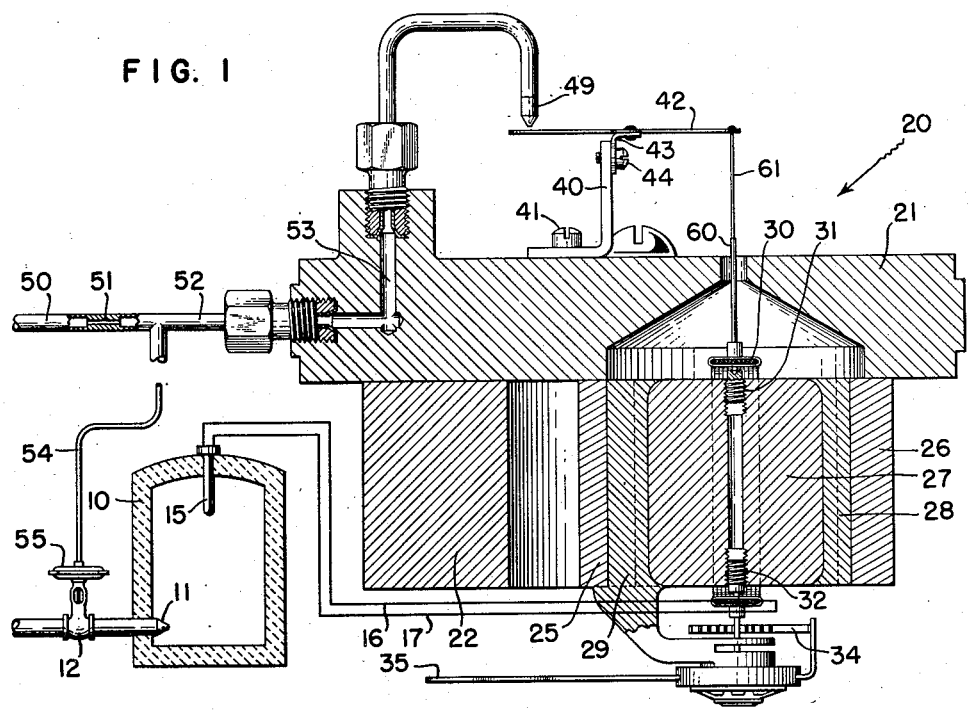

June 3, 1958 — F. W. SIDE — 2,837,104
ROTARY TO LINEAR MOTION TRANSDUCER
Filed May 29, 1953 — 2 Sheets-Sheet 1

INVENTOR.
FREDERICK W. SIDE
BY Arthur H. Swanson
ATTORNEY.

June 3, 1958 F. W. SIDE 2,837,104
ROTARY TO LINEAR MOTION TRANSDUCER
Filed May 29, 1953 2 Sheets-Sheet 2
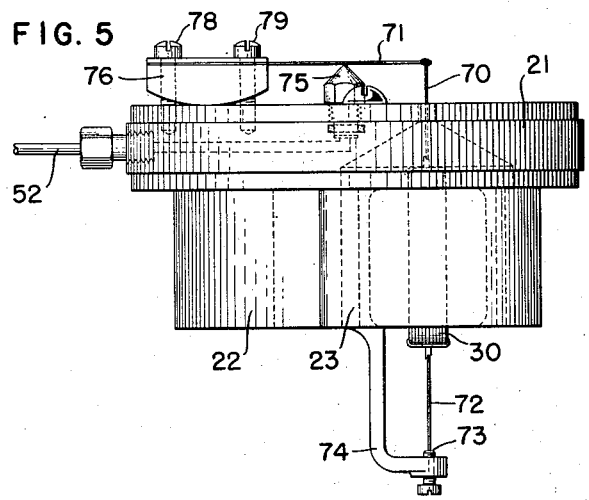
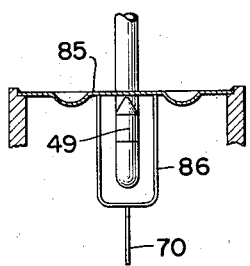
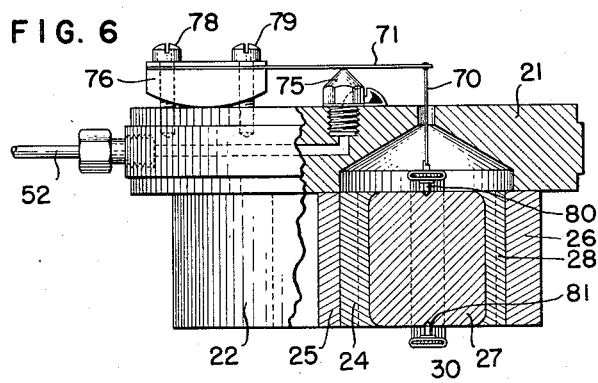
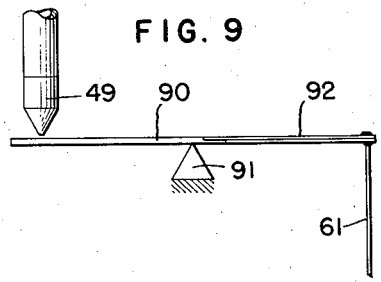
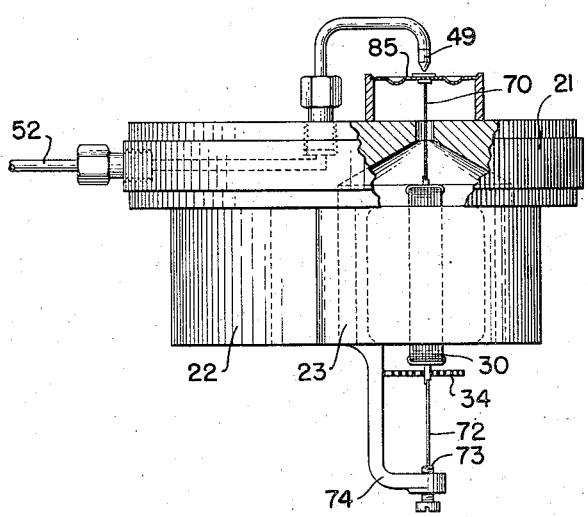
*INVENTOR.*
FREDERICK W. SIDE
BY Arthur H. Swanson
ATTORNEY.

United States Patent Office 2,837,104
Patented June 3, 1958

2,837,104
ROTARY TO LINEAR MOTION TRANSDUCER

Frederick W. Side, Philadelphia, Pa., assignor to Minneapolis-Honeywell Regulator Company, Minneapolis, Minn., a corporation of Delaware Application May 29, 1953, Serial No. 358,424

16 Claims. (Cl. 137—82)

It is a general object of the present invention to provide a new and improved apparatus for converting an electrical signal into a proportional pneumatic pressure. More specifically, an object of the present invention is to provide a highly sensitive electric to pressure transducer which is capable of converting a very minute electrical signal into a pneumatic pressure of sufficient magnitude that a desired controlling action may be directly effected by the output pressure of the transducer.

In the field of automatic process control, it is frequently desirable to determine the value of some variable in terms of an electrical signal and transmit the electrical signal to some remote position where it is converted to a pneumatic signal for control purposes. The most effective transducer for changing an electric signal to a pneumatic signal is one which will produce a pneumatic signal which accurately follows the input electric signal and which has sufficient air handling capacity to directly actuate a suitable pneumatic control device.

It has been found that an electrical coil which is energized by a thermocouple can be caused to move through a relatively large arc when positioned in a magnetic field. Such devices are commonly used in millivoltmeter galvanometers. The torque output of the galvanometer coil is extremely small and it is difficult to utilize this output in creating a proportional pneumatic pressure. One way of obtaining a suitable control action from the rotary motion of a galvanometer coil is to convert that rotary motion into a linear or straight line motion of considerably decreased amplitude which may be used to directly vary the distance between a pneumatic nozzle and flapper apparatus. One of the most effective ways of converting this rotary motion into linear motion has been found to be an elongated coupling member which when twisted will be shortened or elongated, depending upon the direction of twist. Thus, the rotary motion of the galvanometer may be used to twist such a coupling member and produce a shortening or elongating action which may be used to produce a change in a pneumatic pressure.

It is therefore a still more specific object of the present invention to provide a new and improved apparatus incorporating a rotatable electrical coil whose rotary motion is converted into linear motion by a member which when twisted will be shortened or elongated.

Another more specific object of the present invention is to provide an apparatus for converting the motion of a rotary member into linear motion by means of an elongated coupling element which couples the rotatable member to a linear motion utilization apparatus where that coupling is arranged to be shortened or elongated when twisted.

Still another object of the present invention is to provide apparatus for transducing an electrical signal into a proportional pneumatic signal which comprises a rotating galvanometer coil which twists and shortens or elongates a suspension or coupling member to change the relative position betwen a flapper and associated nozzle so that the nozzle pressure will be proportional to the rotary motion of the galvanometer coil.

The various features of novelty which characterize the invention are pointed out with particularity in the claims annexed to and forming a part of the specification. For a better understanding of the invention, its advantages, and specific objects attained with its use, reference should be had to the accompanying drawings and descriptive matter in which there has been illustrated and described preferred embodiments of the invention.

Figure 2:
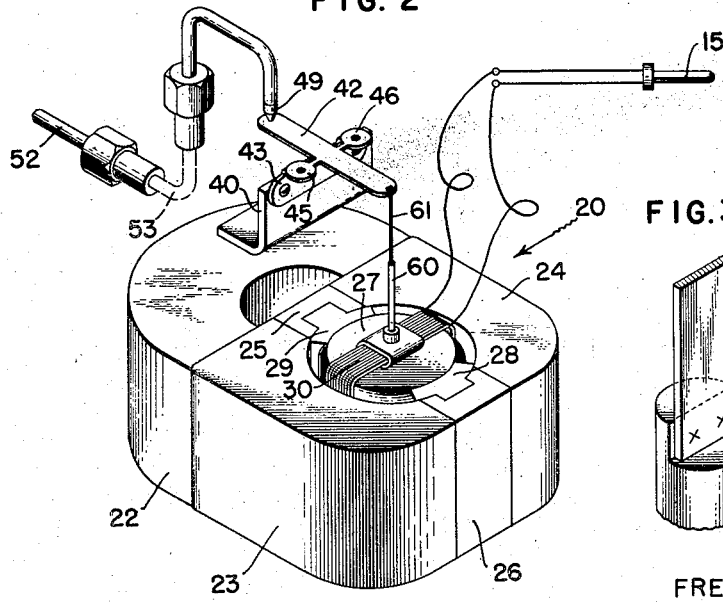
Figures 3, 4:
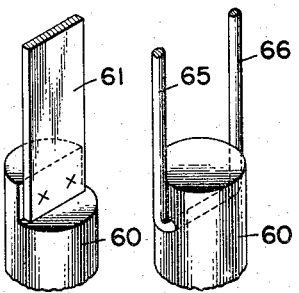

Of the drawings:
Fig. 1 is a diagrammatic showing of the present invention applied to a specific control problem;
Fig. 2 is a perspective view of the apparatus shown in Fig. 1;
Fig. 3 shows one form of a coupling member which may be used in the apparatus;
Fig. 4 shows a modified form of coupling member for the apparatus;
Fig. 5 shows the side view of a modified form of the present invention;
Fig. 6 shows a further modified view of the present apparatus;
Fig. 7 shows a further modification using a diaphragm as the output element;
Fig. 8 shows a modified portion of Fig. 7 for obtaining reverse action; and
Fig. 9 shows one means of obtaining temperature compensation in apparatus of the present type.

Referring now to Fig. 1, the numeral 10 represents a furnace whose temperature is to be controlled with the heat supplied thereto by way of a conduit 11 which conducts a combustible mixture into the furnace and which has a flow regulating valve 12 positioned therein. Sensing the temperature within the furnace 10 is a thermoelectric element 15 which will have an output voltage proportional to the temperature condition within the furnace 10. The output of the thermoelectric device 15 which is preferably a thermocouple, is coupled by way of a pair of leads 16 and 17 to the electric to pneumatic transducer 20.

The transducer 20 comprises a base plate 21 to which is fastened on the lower side thereof a permanent magnet 22 and the pole pieces 23 and 24, which are best shown in Fig. 2. A pair of pole spacers 25 and 26 are positioned between the poles 23 and 24. A cylindrical center pole 27 is centered between the pole pieces 23 and 24 and is retained in position by the spacing elements 28 and 29. Arranged for rotation within the magnetic field between the poles 24 and 23 is a movable coil 30 which is internally pivoted to the center core by pivots 31 and 32. The position of the coil 30 in the field of the poles 23 and 24 will be determined in part on the adjustment of a hair-spring 34 which is arranged to supply a torque to the coil 30 in accordance with the position of an adjusting arm 35. The positioning of the coil 30 between the poles 23 and 24 is also dependent in part upon the signal which is applied thereto by the input leads 16 and 17 of the thermocouple 15.

Mounted on the upper end of the plate 21 is a bracket 40 which is fastened to the plate by means of a screw 41. Fastened to the upper end of the bracket 40 is a flapper 42 which is fastened to the bracket 40 by means of a further bracket 43 attached to the bracket 40 by means of a screw 44. As viewed in Fig. 2, the flapper 42 has a pair of lateral extensions 45 and 46 which are necked down to a small cross sectional dimension at the point of extension from the flapper 42. The flapper 42 is generally formed of some resilient metallic material, such as beryllium, copper or the like, so that the lateral extension will serve as a pivot point for the flapper with the widened portions being available for fastening to the bracket 43.

Cooperating with the left end of the flapper 42 is a nozzle 49 of a pneumatic pressure system which includes a supply line 50 connected to a source of air supply which passes through a restriction 51 and through the conduit 52 to the chambers defined in the block 21 by the drilled out sections 53. The nozzle back pressure in the conduit 52 is arranged to be applied through a conduit 54 to a suitable pneumatic actuator 55 for the valve 12.

The galvanometer coil 30 is connected to the flapper 42 by way of an extension 60 which is rigidly fastened at the lower end to the galvanometer coil and at the upper end to an elongated coupling member 61. The coupling member 61 is rigidly fastened at its upper end to the flapper 42.

The elongated coupling 61 may take the form shown in Fig. 3 wherein the coupling element is an elongated narrow flattened strip of material which is sufficiently resilient that it may be twisted. When twisted, there will be a shortening of the overall length of the coupling element so that the rotary motion of the coil will be transformed into a linear motion of the flapper 42. The coupling element may also take the form shown in Fig. 4 wherein a pair of wires 65 and 66 are fastened to the coil extension 60 by passing the same through a hole in the extension. The spacing between the wires 65 and 66 may be on the order of 0.005 inch to 0.010 inch although this spacing may be enlarged or decreased depending upon the overall length of the coupling element 61. The important factor is that the distance between the wires 65 and 66, or the width of the element 61, shown in Fig. 3, be relatively small when compared to the overall length of the coupling element. The width or spacing of the coupling member should be such as to not introduce any appreciable loading of the galvanometer coil 30 when it is being moved and that the output motion and loading be substantially linear over the range of movement of the galvanometer coil.

In considering the operation of the present apparatus, it is assumed that the conduit 50 is connected to a source of air supply and that this air is passing through the restriction and conduits 52 and 53 to the nozzle 49 with the air issuing therefrom in the form of a jet which is creating a force acting upon the left end of the flapper 42. It is further assumed that the galvanometer coil 30 is in the position shown and that the resulting force due to the position of the coil acting through the coupling member 61 on the flapper 42 is balanced by the force of the jet air stream issuing from the nozzle 49. With the forces on the left end of the flapper balanced, there will be a predetermined air pressure existing in the upstream side of the nozzle 49 and there will be an air pressure in the conduit 54 which will be maintaining the valve actuator 55 in a predetermined position so that the valve 12 will be supplying a fixed amount of combustible material to the furnace 10. The apparatus will remain in this position until the conditions within the furnace change or there is a change in the biasing action applied to the coil 30 by the adjustment of the arm 35 and the torque spring 34.

If the temperature conditions within the furnace 10 should change, the thermocouple 15 will have a change in the output voltage so that the signal applied to the leads 16 and 17 will supply a changed current flow to the galvanometer coil 30. The movement of the galvanometer coil 30 will be about the pivots 31 and 32 and this movement will be fed through the coil extension 60 to the coupling member 61. As the coupling member is in the form shown in either Fig. 3 or Fig. 4, the rotation of the coil extension 60 will be translated into a linear motion which will tend to pull the right end of the flapper 42 downward. This downward pull will tend to create a force which will move the left end of the flapper in an upward direction toward the nozzle 49. The changing of the force tending to push the flapper 42 toward the nozzle 49 will create a nozzle back pressure which will tend to cause a further jet action from the nozzle reacting against the flapper to balance this increased force. This will mean that there will be a higher back pressure which will be present in the conduits 52, 53, and 54 and thus applied to the valve actuator 55. As soon as the temperature within the furnace 10 is returned to the desired value, the thermocouple output voltage will change so that the signal applied to the coil 30 will decrease. The decreased signal will allow the coil 30 to go back to its initial position and the unwinding of the coupling member 61 will cause the net force on the flapper 42 to be of a value indicative of the temperature within the furnace so that the pressure applied to the valve actuator 55 will be of the desired value.

The jet rebalancing features shown in the present application, particularly in Figs. 1 and 2, are also shown in my copending application entitled, "Pneumatic Transducers," filed on even date herewith and bearing Serial No. 358,423.

The apparatus of Fig. 5 is basically the same as that of Figs. 1 and 2 as concerns particularly the galvanometer components and corresponding components carry the same reference numerals as in Figs. 1 and 2. In the arrangement shown in Fig. 5, the principal difference between this figure and that of Fig. 1 lies in the manner of suspending coil 30. In this arrangement, the internal pivots of the coil 30 have been eliminated and the coil is suspended by two elongated elements which may be of the types shown in either of Figs. 3 or 4. An upper suspension element 70 is connected from the coil 30 to a flapper 71 while a suspension 72 connects the lower end of the coil 30 to an adjustable screw 73 carried by a mounting bracket 74. A nozzle 75 cooperates with the flapper 71 to establish a desired back pressure in conduit 52. The flapper 71 is mounted on an adjustable anchor block 76 which has an arcuate surface on a lower side thereof which rides on the surface of the plate 21. A pair of screw members 78 and 79 are provided for rocking the block 76 and therefore adjusting the tensioning of the blade 71 as it applies a force to maintain the suspensions 70 and 72 in a taut condition. The nozzle 75 is relatively adjustable with respect to the flapper 71 so as to establish the desired zero or initial pressure in the system.

While the apparatus of Fig. 5 has been shown with the flapper and nozzle in the upward position on the apparatus, this may not be desirable in certain operating circumstances. The reason for this is that under conditions of extreme vibration, or the like, the entire mass of the coil 30, with the suspensions 70 and 72, is carried by the flapper 71 so that it is more susceptible to vibration. By inverting the apparatus from the position shown so that bracket 74 is on top, this weight will be removed from this flapper 71.

The operation of the apparatus of Fig. 5 is substantially the same as that of Fig. 1 with the exception that the jet rebalancing force of the nozzle 75 is not as effective in establishing the output pressure as is the case of the apparatus shown in Figs. 1 and 2. Here, the twisting of the coil 30 will cause a twisting of the suspensions 70 and 72 and a resultant shortening of the suspension so that the flapper 71 will be moved toward the nozzle 75 to throttle the air issuing therefrom and vary the back pressure in the conduit 52.

The apparatus shown in Fig. 6 is substantially the same as that shown in Fig. 5 with the exception that the coil 30 has been provided with internal pivots. Corresponding components between the two figures carry corresponding reference numerals. In this particular figure, there are internal pivots 80 and 81 with the result that the suspension member 70 is not carried in the weight of the coil 30. This arrangement is much less susceptible to shock and vibration disturbances than the apparatus of Fig. 5 because of the internal mountings of the coil 30. In the arrangement shown in Fig. 6, it is desirable to maintain the apparatus in the upright position, as shown, under circumstances where ambient temperature may be a problem. The reason for this is that if the apparatus were inverted, the pivot 81 would be on top and the coil 30 and the coupling element 70 would be suspended below, with the pivot 80 being effectively free in its cooperating socket. This would mean that ambient temperature changes would act upon coupling 70 and the coil 30 and would affect the overall length to a degree that there would be a pressure change in the output conduit 52.

The apparatus of Fig. 7 is built up from the basic arrangement shown in Figs. 1 and 2 and this arrangement also carries corresponding reference numerals on corresponding elements. This arrangement also incorporates the basic suspension of Fig. 5 and again, corresponding components carry corresponding reference numerals. The addition in the present figure is a diaphragm 85 which serves as the flapper for the pneumatic system. This diaphragm is mounted so that its outer edges are firmly attached to the mounting plate 21 and the center is arranged for flexure by its connection to the coupling element 70. The diaphragm cooperates with the nozzle 49 to vary the back pressure in the pneumatic system.

In Fig. 7 as in the previous figures, the rotation of the coil 30 will cause a twisting of the suspensions 70 and 72 with a resultant movement of the diaphragm 85 with respect to the nozzle 49. The movement of the diaphragm with respect to the nozzle will change the pneumatic pressure in the control system.

Fig. 8 demonstrates one way in which reverse action may be obtained with respect to apparatus of the type shown in Fig. 7. Here, the diaphragm 85 has a yoke member 86 coupled thereto and the yoke is in turn connected to the coupling 70. In this arrangement, the nozzle 49 is placed on the lower side of the diaphragm so that as the suspension 70 is twisted, the diaphragm 85 will be pulled downwardly to cause an increase in the pressure in the pneumatic system to which the nozzle 49 is connected.

Fig. 9 shows one way in which temperature compensation may be effected in a controller of the present type. In this figure, the nozzle 49 cooperates with a flapper member 90 which is pivoted at 91 with the flapper having included as a section thereof a bimetallic element 92 which is sensitive to the ambient temperature conditions. The right end of the bimetallic element is connected to the elongated coupling element 61. The flexure of the bimetallic portion 92 will be effective to change the force acting in the flapper combination with respect to the nozzle 49 with a resultant change in the output pressure of the apparatus in accordance with ambient temperature changes.

In all of the embodiments of the present invention, it will be understood that the elongated coupling element which is effective for translating the rotary motion of the galvanometer coil into linear motion may take the form shown in either of Figs. 3 or 4. It will further be obvious that ambient temperature compensation may be embodied in any of the configurations.

While, in accordance with the provisions of the statutes, there has been illustrated and described the best forms of the embodiments of the invention known, it will be apparent to those skilled in the art that changes may be made in the form of the apparatus disclosed without departing from the spirit of the invention as set forth in the appended claims and that in certain cases, certain features of the invention may be used to adavntage without a corresponding use of other features.

Having now described my invention, what I desire to secure by Letters Patent is:

1. An electric to pressure transducer comprising, an electrical coil arranged for rotative movement in a magnetic field in accordance with the magnitude of an input electrical signal, a pneumatic pressure producing device arranged to convert an input motion to a pneumatic pressure, and means for converting the rotary motion of said coil into a motion for actuating said pressure producing device, said means comprising an elongated element coupled between said coil and said device the length of which element is changed when twisted by said coil.

2. A transducer for converting rotary motion into a pneumatic pressure comprising, a member adapted to rotate, a motion to pressure converter having a motion input and pressure output, and an element whose length varies when twisted by said member connected between said member and said converter input so as to convert the rotary motion of said member into a pneumatic pressure.

3. A transducer for converting a rotary motion into a proportional pneumatic pressure comprising, a member adapted to rotate about a pivoted axis, a motion to pressure converter requiring a linear motion input and having a pressure output, and an elongated element whose length varies with twisting by said member connected between said member at its pivotal axis and said converter input.

4. A transducer as claimed in claim 3 wherein said elongated element comprises a narrow flattened strip of resilient material.

5. A transducer as claimed in claim 3 wherein said elongated element comprises a pair of parallel wires.

6. Apparatus for converting an electrical signal into a proportional pneumatic pressure comprising, an electrical coil arranged for rotary movement in a magnetic field, a pair of suspension members holding said coil in said field, said suspension members when twisted having a changed overall length, and a pneumatic flapper connected to one of said suspension members and arranged to move relative to a pneumatic nozzle when said suspension members are twisted by said coil to thereby produce a varying pneumatic pressure in said nozzle.

7. Apparatus for converting an electrical signal into a proportional pneumatic pressure comprising, an electrical coil arranged for rotary movement in a magnetic field, a pair of internal pivots holding said coil for rotation about a fixed axis in said field, a pneumatic flapper and nozzle apparatus, and means coupled between said coil at its pivot axis for effecting relative movement between said flapper and nozzle, said means comprising a member whose length is changed when twisted or untwisted by the rotary movement of said coil.

8. Apparatus for converting an electrical signal into a proportional pneumatic pressure comprising, an electrical coil arranged for rotary movement in a magnetic field, a pair of suspension members holding said coil in said field, said suspension members when twisted having a changed overall length, a pneumatic flapper in the form of a semi-rigid blade, an adjustable anchor block for one end of said flapper, means connecting the other end of said flapper to one of said suspension members so that said flapper will be moved when said suspension members are twisted by said coil, and a pneumatic nozzle cooperating with said flapper for creating a pneumatic pressure proportional to the twisting action of said coil.

9. Apparatus for converting an electrical signal into a proportional pneumatic pressure comprising, an electrical coil arranged for rotary movement in a magnetic field, a pair of internal pivots holding said coil for rotation about a fixed axis in said field, a pneumatic flapper in the form of a flattened resilient member, an adjustable anchor block for one end of said flapper, means connecting the other end of said flapper to said coil, said means comprising an elongated element fastened so as to be twisted by the rotary movement of said coil and produce straight line movement of said flapper, and a pneumatic nozzle cooperating with said flapper for creating a pneumatic pressure proportional to the twisting action of said coil.

10. Apparatus for converting an electrical signal into a proportional pneumatic pressure comprising, an electrical coil arranged for rotary movement in a magnetic field, a pair of suspension members holding said coil in said field, said suspension members when twisted having a changed overall length, a resilient diaphragm rigidly fastened at its edges and arranged for flexure at its center, means fastening one of said suspension members to the effective center of said diaphragm, and a pneumatic nozzle positioned adjacent the diaphragm which acts as a baffle for establishing a pneumatic pressure in said nozzle dependent upon the relative adjustment of said diaphragm with respect to said nozzle.

11. A rotary to linear motion transducer comprising, an element pivotally mounted and adapted for rotary movement, an elongated coupling member which will shorten when twisted and lengthen when untwisted fastened at one end to said element and extending in alignment with the pivotal axis of said element, a linear motion output member arranged for linear movement along a line defined by an extension of the pivotal axis of said element, and means rigidly fastening said coupling member to said output member so that the rotary motion of said first named element will be translated into linear motion by the twisting of said coupling member.

12. A rotary to linear motion transducer comprising, a rotatable element arranged for movement about a pivotal axis, a linear motion output element arranged for linear motion along a line defined by an extension of said pivotal axis, and an elongated coupling element rigidly fastened at one end to said rotatable element and at the other end to said linear motion output element, said coupling element being adapted to shorten in length when twisted and lengthen when untwisted by the rotary motion of said rotatable element.

13. Apparatus as defined in claim 12 wherein said motion output element comprises a diaphragm whose principal plane is parallel to the plane defined by the rotation of said rotatable member.

14. Apparatus as defined in claim 12 wherein said motion output member is a baffle in a pneumatic pressure producing apparatus.

15. Apparatus as defined in claim 12 wherein said coupling element comprises a narrow flattened strip of material.

16. Apparatus as defined in claim 12 wherein said coupling element comprises a pair of parallel wires whose spacing is small compared to the length of said wires.

References Cited in the file of this patent

UNITED STATES PATENTS

| | | |
|---|---|---|
| 444,803 | Weston | Jan. 31, 1891 |
| 1,540,770 | Field | June 9, 1925 |
| 2,033,318 | Abramson | Mar. 10, 1936 |
| 2,065,702 | Hubbard | Dec. 29, 1936 |
| 2,564,669 | Brady | Aug. 21, 1951 |
| 2,601,867 | Alyea | July 1, 1952 |
| 2,717,611 | Lerousseau et al. | Sept. 13, 1955 |

FOREIGN PATENTS

| | | |
|---|---|---|
| 689,814 | France | June 2, 1930 |
| 562,645 | Great Britain | July 11, 1944 |